United States Patent
Kawashima et al.

(10) Patent No.: US 10,736,466 B2
(45) Date of Patent: *Aug. 11, 2020

(54) RICE WASHER

(71) Applicant: Tiger Kawashima Company Limited, Oura-gun, Gunma (JP)

(72) Inventors: Seizo Kawashima, Gunma (JP); Fumitaka Sekiguchi, Gunma (JP); Yuji Shimizu, Gunma (JP); Tomohiro Iizuka, Gunma (JP); Satoru Imura, Gunma (JP)

(73) Assignee: TIGER KAWASHIMA COMPANY LIMITED, Gunma (JP)

( * ) Notice: Subject to any disclaimer, the term of this patent is extended or adjusted under 35 U.S.C. 154(b) by 240 days.

This patent is subject to a terminal disclaimer.

(21) Appl. No.: 15/898,234

(22) Filed: Feb. 16, 2018

(65) Prior Publication Data

US 2018/0235405 A1 Aug. 23, 2018

(30) Foreign Application Priority Data

Feb. 17, 2017 (JP) ................................ 2017-028319

(51) Int. Cl.
*A47J 43/24* (2006.01)
*A23N 12/02* (2006.01)

(52) U.S. Cl.
CPC .............. *A47J 43/24* (2013.01); *A23N 12/02* (2013.01)

(58) Field of Classification Search
None
See application file for complete search history.

(56) References Cited

U.S. PATENT DOCUMENTS 2,914,005 A * 11/1959 Donde ...................... B02B 1/00
425/311
5,997,930 A * 12/1999 Kendall .................. A47J 27/16
426/455

(Continued)

FOREIGN PATENT DOCUMENTS

| JP | S57-183810 A | 11/1982 |
| JP | 5-192594 A | 8/1993 |

(Continued)

OTHER PUBLICATIONS

Third party observation in JP Application No. 2017-028319, mailed Oct. 9, 2018, 7pp.

*Primary Examiner* — Christi J Tate-Sims
(74) *Attorney, Agent, or Firm* — Hauptman Ham, LLP

(57) ABSTRACT

Rice-washing work can be easily performed by anyone, and proper rice-washing of various kinds of rice can be performed irrespective of an amount of rice. Namely, conventional apparatuses have not dealt with water absorption, infiltration, swelling, weakening, dissolving, and unpleasant taste, making it difficult to secure Japanese style rice quality in a white rice state. The present invention provides a rice-polishing technique for reproducing the quality. Provided is a rice washer that can be installed in a saved space not to cause obstruction even when installed in a kitchen. The rice washer according to the present invention includes a charging part into which milled rice is charged; a pressurized-stirring part provided at a rear-stage of the charging part and configured to, while pressurizing, stir and sequentially feed the milled rice charged from the charging part; a first water supply part configured to supply water to the pressurized-stirring part.

11 Claims, 15 Drawing Sheets

(56) References Cited

U.S. PATENT DOCUMENTS 6,273,106 B1 * 8/2001 Saitoh ................... B01D 41/02
                                                                134/131
7,690,295 B2 * 4/2010 Ishizuka ................. B02B 1/02
                                                                 241/86

FOREIGN PATENT DOCUMENTS

JP           H7-125 A      1/1995
JP      2009-248016 A     10/2009

* cited by examiner

RICE WASHER

CROSS-REFERENCE TO RELATED APPLICATION

This non-provisional application claims priority under 35 U.S.C. § 119(a) from Japanese Patent Application No. 2017-028319, filed on Feb. 17, 2017, the entire contents of which are incorporated herein by reference.

BACKGROUND

Technical Field

The present invention relates to a space-saving rice washer capable of automatically and continuously washing milled rice that has been charged.

Background Art

To rice (milled rice) that has been subjected to a processing step (rice milling) of exclusively extracting endosperm from brown rice, a bran component (starch layer) is attached (coated) on a surface of endosperm (white rice) as if being smeared. When the milled rice coated with this bran component is cooked as it is, a undesirable component (unpleasant taste component) in the coating bran component causes the rice to become slightly yellow, and the rice does not become delicious cooked rice.

Moreover, in rice cooked with a hot-water-draining rice cooking method without washing the rice, there remain this unpleasant taste component, and a lot of bran with oil-and-fat oxidation product component, dirt, mold odor, and the like that are generated by storing after milling the rice. Such rice is unsuitable for dishes where taste of rice itself stands out, such as sushi (shari) rice, rice balls, and rice for Japanese cuisine. In other words, for obtaining delicious rice, quality of rice-washing work before cooking rice is highly required and indispensable.

Here, for washing rice, it is desirable to add water to milled rice and stir the milled rice while pressurizing, and apply a state in which rice grains slightly touch and pass each other (a frictional separation effect), under a condition where there are the rice grains, water, and an air space. Thereby, there are performed "rice-polishing" for peeling a coating component from the rice grains, and "rice-rinsing" for diluting the coating component peeled from the rice grains to separate and release the coating component. Generally, these "rice-polishing" and "rice-rinsing" operations are indispensable for washing rice. In the present specification, this "rice-polishing" is also referred to as "polishing" and "rice-rinsing" as "rinsing".

As an apparatus for washing milled rice, JP 2009-248016 A describes a rice washer in which a whole amount of milled rice to be washed is charged into a rice-washing tank, supplied with water, and washed with a stirring rod. However, such a rice washer using the stirring rod results in imperfect finishing of rice-washing. In other words, a substance to be removed by washing rice, as it is called starch layer bran (aleurone layer), has a sticky property like a glue or adhesive as a physical property, and the rice washer using the stirring rod described in JP 2009-248016 A is not capable of sufficiently removing such a starch layer bran (aleurone layer) because of lack of proper pressure required for rice-polishing.

Proper removal of the starch layer bran from rice grains requires operations of frictional separation and peeling from the rice grains with water, and separation removal of the starch layer bran. Specifically, rice-polishing is performed by pouring water into milled rice, agitating once and discarding the water, and mixing (stirring) the wet rice grains alone. In rice-polishing, a speed difference and air in a space between individual rice grains promote mutual contact of the grains, adding a strong frictional separation (polishing) action to the rice grains. This state is continued for a few seconds, water is added again, and agitation (while the rice grains are suspended in the water) is gently performed (rinsing/separating dilution). Then, the water is discarded (separation removal), and the wet rice grains alone are agitated again (rice-polishing). Water is added again and slightly agitated (rinsing/separating dilution). This operation is repeated at least three times.

Here, for rice grains soaked fully and sunk in the water, a frictional separation effect between rice grains does not exert at all, and rice grains are not washed no matter how stirring and mixing operations are applied. That is, a polishing effect does not exert. On the other hand, when water is discarded and stirring is performed with the rice grains being fully wet, the frictional separation effect exerts between rice grains that are not subjected to buoyancy of water, enabling rice-polishing.

Then, water is added; dirt components polished off are diluted, separated, and discarded (rinsing); a rice water ratio is adjusted; and a rice cooker is switched on at the end. To obtain delicious rice, even in a small amount of rice cooking, the above-mentioned rice washing (rice-polishing and rice-rinsing) is an indispensable operation process.

In the rice washer using the stirring rod, it is not possible to sufficiently perform such rice-washing work that is indispensable for obtaining delicious rice. In addition, with a peeling force of polishing with a brush without using water, it is not possible to wash and remove a sticky substance from rice grains by peeling or separating.

JP H5-192594 A describes a wash-free rice producing apparatus that pressurizes and stirs milled rice while conveying the milled rice with a screw blade. This wash-free rice producing apparatus can provide a frictional separation effect, and is highly effective for removing starch layer bran from rice grains as compared with a rice washer that performs brush-polishing.

SUMMARY OF THE INVENTION

Problems to be Solved by the Invention

A small amount of rice used in a household (e.g., about 0.14 kg to 2.9 kg) does not cause a problem in washing rice manually. However, in cooking rice in a large pot (about 3 kg or more) such as in shops, companies, schools, manually washing rice tends to pose a problem due to physical properties of rice grains.

That is, in rice-washing, rice-polishing and rice-rinsing operations have a very limited time (unit of over ten seconds). The very limited time in the rice-washing is arising from intrinsic water absorption characteristics of rice grains, and a softening vulnerability of starch granule characteristics of a main ingredient of the rice grains.

In general, for cooking rice of about 3 kg or more, rice-washing machines of a mechanical circulation lot batch type or a water-flow-stirring circulation batch type are mainly used. However, these machines are difficult to operate, the water flow type requires considerable amount of wasteful tap water and also requires a large-sized air compressor and the like, impairing simplicity and convenience.

Further, in these automatic rice-washing machines, a method for washing rice by taking long time for washing rice, and stirring rice that is suspended in water almost without pressurization is the mainstream. In this method, the frictional separation effect does not exert between rice grains. This impairs washing and separating effects for microorganisms (mainly bacteria) adhering to degermed and depressed portion of rice grains and the like. In addition, a large and wide installation area is required, a temporal amount of production is small, and it is not possible to obtain a sufficient rice-washing yield rate and rice wash performance. This also results in increasing of a rotting speed of cooked rice.

It is an object of the present invention to enable rice-washing work to be easily performed by anyone, and proper rice-washing of various kinds of rice irrespective of an amount of the rice. Namely, conventional apparatuses have not dealt with water absorption, infiltration, swelling, weakening, dissolving, and unpleasant taste, making it difficult to secure Japanese style rice quality in a white rice state. The present invention provides a rice-polishing technique for reproducing the quality. It is also an object of the present invention to provide a rice washer that can be installed in a saved space not to cause obstruction even when installed in a kitchen.

Means for Solving the Problems

To solve the above problems, the rice washer according to the present invention includes: a charging part into which milled rice is charged; a pressurized-stirring part provided at a rear-stage of the charging part and configured to, while pressurizing, stir and sequentially feed the milled rice charged from the charging part; a first water supply part configured to supply water to the pressurized-stirring part. According to such a configuration, by feeding milled rice into the pressurized-stirring part while supplying water from the first water supply part to the pressurized-stirring part, rice-polishing with pressurization to the milled rice and rice-rinsing by stirring are performed. That is, rice-polishing and rice-rinsing are performed within a limited time by the pressurized-stirring part. Performing rice-polishing and rice-rinsing while sequentially charging milled rice into the pressurized-stirring part enables efficient and continuous rice washing of a desired amount of rice even in a saved space.

In the rice washer according to the present invention, the pressurized-stirring part may include: a cylinder; a shaft part configured to rotate in the cylinder; a spiral blade configured to rotate together with the shaft part in the cylinder and sequentially feed milled rice charged from the charging part; a projecting strip portion provided at a rear-stage of the spiral blade and configured to rotate together with the shaft part in the cylinder; a rinsing blade provided at a rear-stage of the projecting strip portion and configured to rotate together with the shaft part in the cylinder; and a pressure adjusting part configured to adjust pressure applied to the milled rice in the cylinder. According to such a configuration, the milled rice in the cylinder is sequentially fed by rotation of the spiral blade while receiving a predetermined pressure by the pressure adjusting part. This causes a frictional separation effect between rice grains with rotation of the projecting strip portion, in the milled rice fed to a position of the projecting strip portion. Further, milled rice fed to a position of the rinsing blade is subjected to rinsing/separating dilution with rotation of the rinsing blade.

In the rice washer according to the present invention, the first water supply part may include: a first water supply nozzle configured to supply water toward the spiral blade in the cylinder; a second water supply nozzle configured to supply water toward the projecting strip portion in the cylinder; and a third water supply nozzle configured to supply water toward the rinsing blade in the cylinder. According to such a configuration, the milled rice wetted by the water supplied from the first water supply nozzle is mixed in a turbulent flow and agitated together with the spiral blade. While the milled rice wetted by the water supplied from the second water supply nozzle receives pressure with the rotation of the projecting strip portion, rice grains are brought into contact with each other, and the starch layer bran is frictionally separated and peeled. In addition, rice-rinsing is performed by the water supplied from the third water supply nozzle, with rotation of the rinsing blade.

The rice washer according to the present invention may further include a separation part provided at a rear-stage of the pressurized-stirring part and configured to separate the milled rice and water. According to such a configuration, rinsing/separating dilution is additionally performed by the separation part for the milled rice that has been subjected to rice-polishing and rice-rinsing with the pressurized-stirring part.

In the rice washer according to the present invention, the separation part may include: a mesh part arranged inclined; and a drainage passage disposed below the mesh part. Then, the separation part may be configured such that water passes through the mesh part and is discharged from the drainage passage, while milled rice falls along the inclination of the mesh part without passing through the mesh part. This causes the water after rinsing to pass through the mesh part and fall, enabling separation and extraction of the washed milled rice from which unnecessary moisture has been removed.

The rice washer according to the present invention may be provided with a draining separation plate on a back side of the mesh part. This causes the water having passed through the mesh part after rinsing to fall efficiently along the draining separation plate. Further, the rice washer according to the present invention may further be provided with a second water supply part configured to supply rinsing water to the separation part. This enables rinsing of the milled rice moving through the separation part with the water supplied from the second water supply part.

Further, the rice washer according to the present invention may further be provided with a foreign matter removing part configured to remove a foreign matter mixed in the milled rice fed from the pressurized-stirring part. This enables removal of a foreign matter that may be slightly left in the milled rice having been subjected to the rice-polishing and the rice-rinsing.

Further, the rice washer according to the present invention may further be provided with a water flow conveying part provided in a step after an outlet of the pressurized-stirring part, and configured to convey the milled rice with a water flow. The water flow conveying part may include: a conveying pipe provided with a suction port to suck the milled rice; a conveyance water feeding part configured to supply conveyance water to the conveyance pipe; and an air mixing part configured to mix air into the conveyance water between the conveyance water feeding part and the suction port. This causes a water flow to convey the milled rice having been subjected to rice-polishing and rice-rinsing with the pressurized-stirring part, to a desired position, and allows expectation to improve rinsing performance by a water flow.

DETAILED DESCRIPTION OF THE EMBODIMENTS

Figure 1:
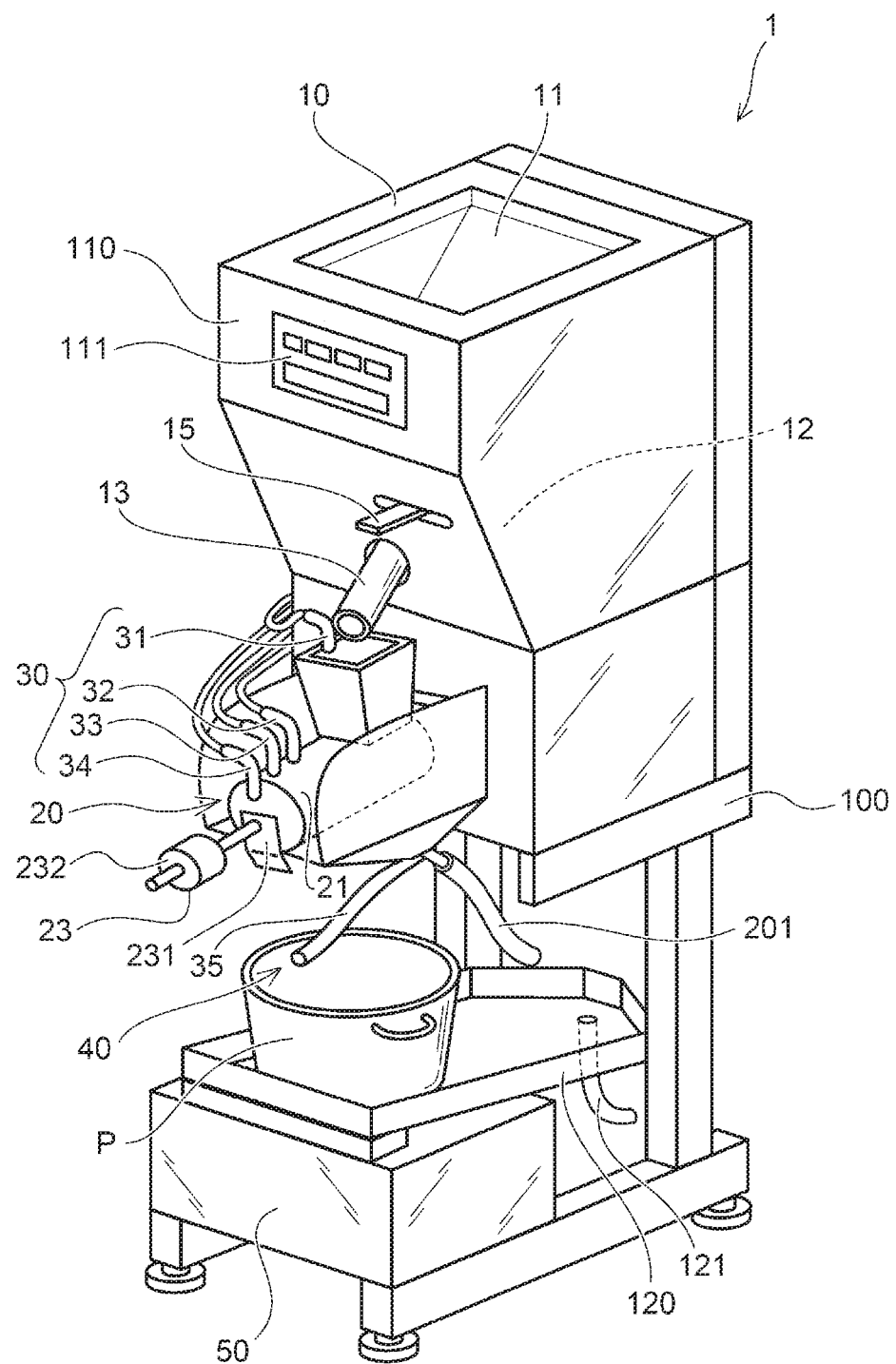
FIG. 1 is a perspective view illustrating a rice washer according to a first embodiment.

Hereinafter, embodiments of the present invention will be described with reference to the drawings. In the following description, identical members are denoted by identical reference numerals, and description of members once described is appropriately omitted.

First Embodiment (Overall Configuration of Apparatus)

FIG. 1 is a perspective view illustrating a rice washer according to a first embodiment.

Figure 2:
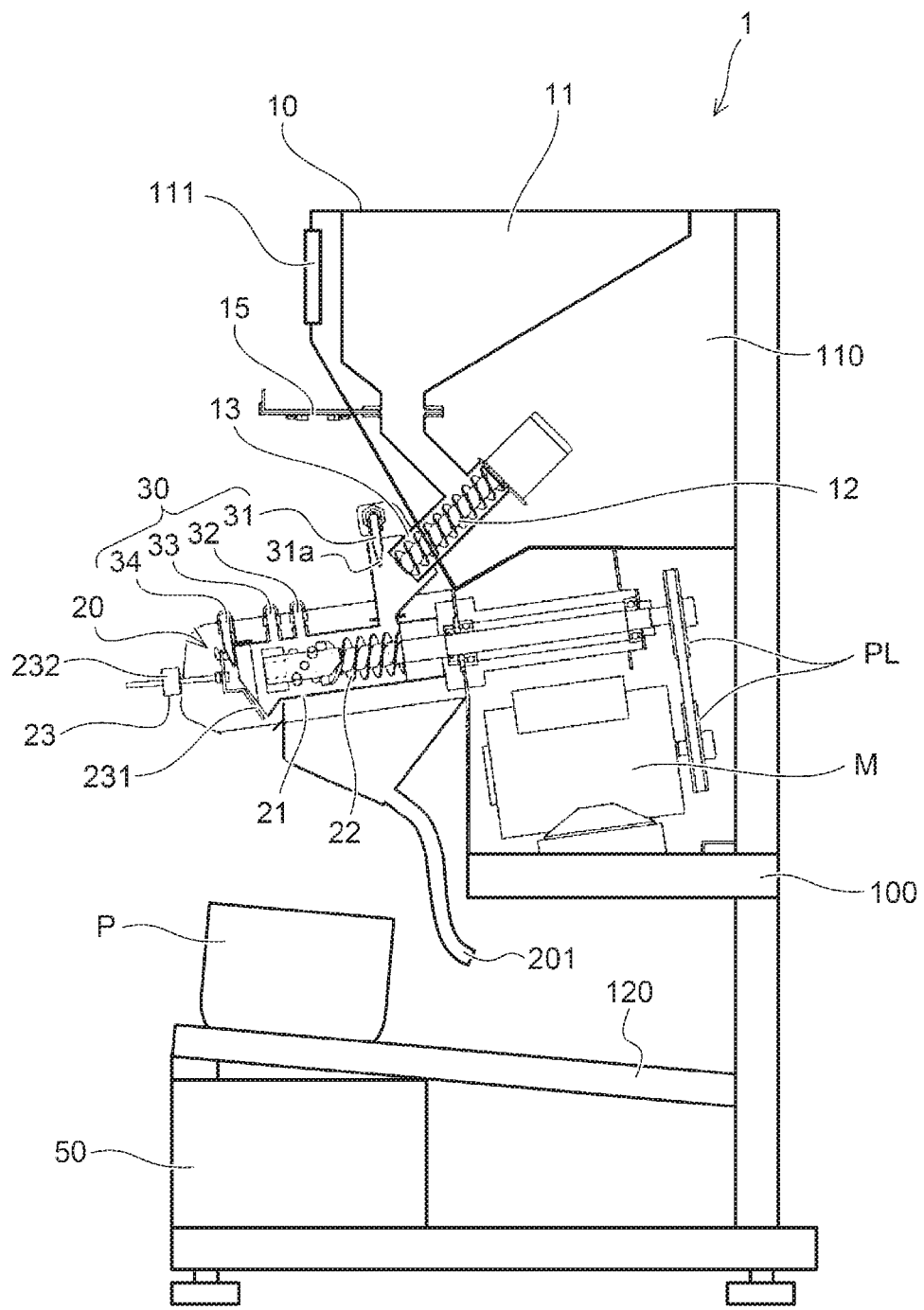
FIG. 2 is an internal configuration view illustrating the rice washer according to the first embodiment.

FIG. 2 is an internal configuration view illustrating the rice washer according to the first embodiment.

A rice washer 1 according to the present embodiment is an apparatus that continuously performs rice-washing by charging milled rice. The rice washer 1 includes a charging part 10, a pressurized-stirring part 20, and a first water supply part 30. The charging part 10 is disposed above a housing 100, and has a hopper 11 to charge milled rice and a feeding part 12 provided below the hopper 11. As the feeding part 12, for example, a spiral blade is used. The milled rice charged from the hopper 11 with rotation of the spiral blade is fed to the pressurized-stirring part 20 at a rear-stage.

Between the hopper 11 and the feeding part 12, an opening/closing lever 15 is provided. Keeping the opening/closing lever 15 closed allows the hopper 11 to store the milled rice charged into the hopper 11, to stop rice-washing process. To proceed with the rice-washing process, the opening/closing lever 15 is opened to feed the milled rice stored in the hopper 11 into the feeding part 12. The spiral blade of the feeding part 12 is provided as a feeding part for stable segmentation of a certain rice amount in a differential time unit. However, the spiral blade may be omitted when there is a certain stable condition alone from a viewpoint of quality and variety of rice. The entire feeding part 12 may also be omitted. In this case, an amount of milled rice to be fed from the hopper 11 to the pressurized-stirring part 20 is adjusted by an opening amount of a shutter linked with opening/closing of the opening/closing lever 15.

An operation display part 111 may be provided on a front surface of a cover 110 that externally covers the charging part 10. The operation display part 111 is, for example, a touch panel display, which displays operation buttons (icons), a processing state, and the like.

The pressurized-stirring part 20 is disposed at a middle-stage of the housing 100 (rear-stage of the charging part 10). The pressurized-stirring part 20 stirs and sequentially feeds the milled rice charged from the charging part 10 while pressurizing the milled rice. By pressurizing and stirring with the pressurized-stirring part 20, rice-polishing and rice-rinsing of the milled rice are performed. The pressurized-stirring part 20 sequentially and continuously performs rice-polishing and rice-rinsing while feeding the milled rice. Details of the pressurized-stirring part 20 will be described later.

The first water supply part 30 supplies water to the pressurized-stirring part 20. Supplying water from the first water supply part 30 to the pressurized-stirring part 20 provides water required for rice-polishing and rice-rinsing performed by the pressurized-stirring part 20. In the present embodiment, the first water supply part 30 includes a first water supply nozzle 31, a second water supply nozzle 32, and a third water supply nozzle 33.

The first water supply nozzle 31 supplies water to a front-stage part in the pressurized-stirring part 20 (feeding part for the milled rice). In a configuration in which the spiral blade of the feeding part 12 or the entire feeding part 12 is omitted, water may be supplied near a base of the cylinder 21 provided in the pressurized-stirring part 20. The second water supply nozzle 32 supplies water to a middle-stage part in the pressurized-stirring part 20 (polishing part for the milled rice). The third water supply nozzle 33 supplies water to a rear-stage part in the pressurized-stirring part 20 (rinsing part for the milled rice).

The first water supply part 30 may have a fourth water supply nozzle 34. The fourth water supply nozzle 34 supplies water near an outlet of the pressurized-stirring part 20. This enables rinsing of the milled rice discharged from the pressurized-stirring part 20, and washing out of softened rice grains smoothly.

At a stage below the housing 100, there is provided a placing part 50 to be placed with a pot P or the like, to receive the milled rice discharged from the pressurized-stirring part 20. On the placing part 50, an inclined tray 120 is provided. Placing the pot P below the outlet side of the pressurized-stirring part 20, on a front side of the tray 120, allows the pot P to receive the milled rice coming out from the pressurized-stirring part 20. Further, inclination of the tray 120 being lowered rearward allows a flow of the water discharged from the pressurized-stirring part 20 and the water overflowing from the pot P to rearward of the housing 100, to be discharged from a hose 121.

The rice washer 1 may be provided with a foreign matter removing part 40. For example, the foreign matter removing part 40 is configured to supply water toward the pot P to form a water flow in the pot P. This allows a foreign matter to float with the water flow and to be discharged outside of the pot P, even when the foreign matter is mixed in the milled rice fed from the pressurized-stirring part 20 and accommodated in the pot P.

(Configuration of Pressurized-Stirring Part)

Figure 3:
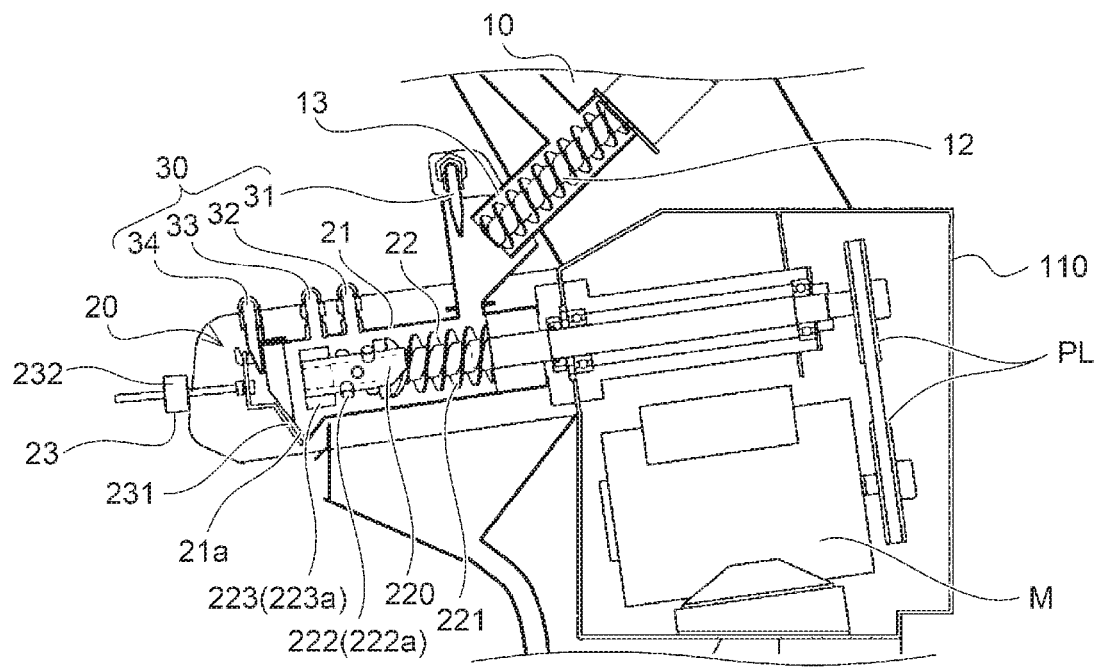
FIG. 3 is an internal configuration view illustrating a configuration of a pressurized-stirring part.

FIG. 3 is an internal configuration view illustrating a configuration of the pressurized-stirring part.

Figure 4:
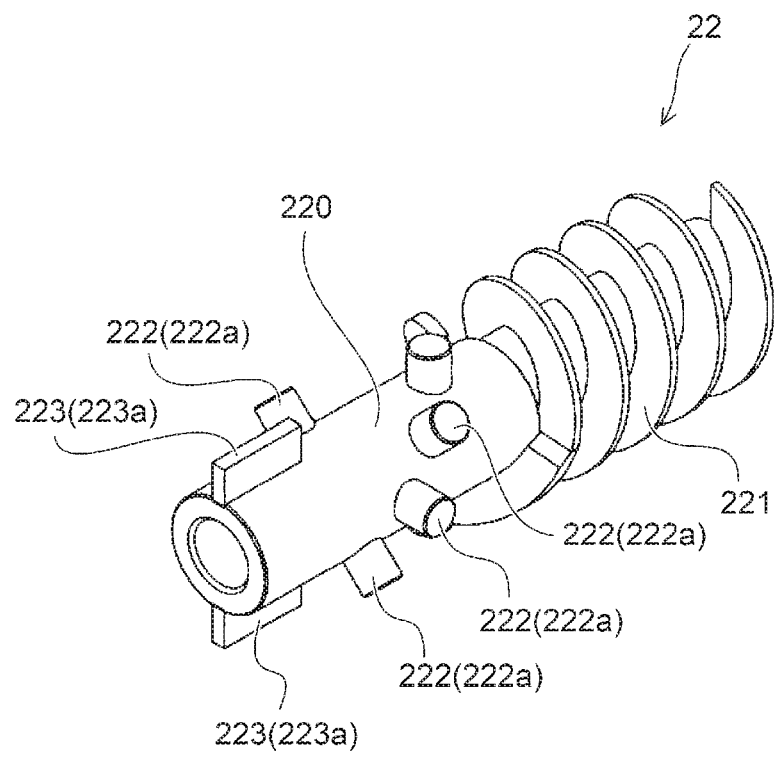
FIG. 4 is a perspective view illustrating a pressurized-stirring screw.

FIG. 4 is a perspective view illustrating a pressurized-stirring screw.

The pressurized-stirring part 20 includes the cylinder 21, a pressurized-stirring screw 22 provided in the cylinder 21, and a pressure adjusting part 23. The cylinder 21 is provided to protrude forward while facing slightly downward, from a lower side of the cover 110 of the charging part 10.

The pressurized-stirring screw 22 is provided in the cylinder 21 and configured to rotate about a shaft. In the cover 110, a motor M configured to rotationally drive the pressurized-stirring screw 22 is provided. The rotation of the motor M is transmitted to the pressurized-stirring screw 22 via a pulley PL.

The pressure adjusting part 23 is provided at a front of the cylinder 21. The pressure adjusting part 23 includes a lid 231 configured to close an opening 21a provided on the projecting end side of the cylinder 21, and a weight 232 configured to adjust pressure. A position of the weight 232 is adjustable, and pressure for closing the lid 231 is adjusted by the position of the weight 232.

The pressurized-stirring screw 22 has a shaft part 220 configured to rotate in the cylinder 21, a spiral blade 221, a projecting strip portion 222, and a rinsing blade 223 that are configured to rotate together with the shaft part 220. The spiral blade 221 is provided on a front-stage side (a side close to the charging part 10) of the shaft part 220. The spiral blade 221 serves to sequentially feed the milled rice charged from the charging part 10 to a rear-stage side along the rotating spiral blade 221. When being fed to the rear-stage along the spiral blade 221, the milled rice comes in contact with the water supplied from the first water supply part 30, and is to be fed while being agitated with the water and the rice grains being mixed in a turbulent flow in a space.

The projecting strip portion 222 is provided on a rear-stage side of the spiral blade 221. The projecting strip portion 222 has a plurality of protruding portions 222a. The plurality of protruding portions 222a are arranged so as to draw a spiral around the shaft part 220 at predetermined intervals. The projecting strip portion 222 generates a frictional separation effect between rice grains, for the sequentially fed milled rice. To the projecting strip portion 222, a proper amount of water is supplied from the first water supply part 30. Wetted milled rice is agitated in the cylinder 21 with rotation of the plurality of protruding portions 222a, and rice grains collide with each other. This collision causes the frictional separation effect between rice grains, enabling rice-polishing.

As a result, since the plurality of protruding portions 222a are arranged so as to draw a spiral around the shaft part 220, the frictional separation effect can be uniformly applied to the milled rice fed by the spiral blade 221. The protruding portion 222a may have various kinds of shape, such as a cylindrical shape, a prismatic shape, or an elliptic cylindrical shape. However, a shape having a curved surface such as a cylindrical shape or an elliptical cylindrical shape allows milled rice in contact with the protruding portion 222a to be rollingly agitated, enabling rice-polishing with the frictional separation effect caused by contact between the rice grains or contact of the rice grains with the projecting strip portion 222 or an outer wall cylindrical portion in the cylinder 21.

The rinsing blade 223 is provided on a rear-stage side of the projecting strip portion 222. The rinsing blade 223 has a plurality of plate blades 223a. In the present embodiment, two plate blades 223a are provided at positions different from each other by 180 degrees around the shaft part 220. To the rinsing blade 223, a proper amount of water is supplied from the first water supply part 30. This causes the milled rice to be agitated with rotation of the rinsing blade 223. This causes rice-rinsing.

The lid 231 of the pressure adjusting part 23 is configured to close the opening of the cylinder 21 with weight of the weight 232. Whereas, milled rice is sequentially fed into the cylinder 21 by rotation of the pressurized-stirring screw 22. This causes the milled rice to receive a predetermined pressure in the cylinder 21, generating a frictional separation effect between rice grains. Then, when the pressure from the milled rice in the cylinder 21 to the lid 231 becomes larger than the pressure for closing the lid 231 with the weight 232, the lid 231 opens to discharge the milled rice from the opening 21a of the cylinder 21.

Into the cylinder 21, water is supplied from the first water supply nozzle 31, the second water supply nozzle 32, and the third water supply nozzle 33 of the first water supply part 30 that are described above. The first water supply nozzle 31 supplies water toward the spiral blade 221. The second water supply nozzle 32 supplies water toward the projecting strip portion 222. The third water supply nozzle 33 supplies water toward the rinsing blade 223.

A water discharge port 31a of the first water supply nozzle 31 is desirably provided slightly above the feeding part 12 of the charging part 10. This causes the milled rice coming out of the feeding part 12 to be in contact with the water supplied from the first water supply nozzle 31 in a passage until being fed to the pressurized-stirring part 20, and to be smoothly fed into the cylinder 21 with the force of water.

Figure 5:
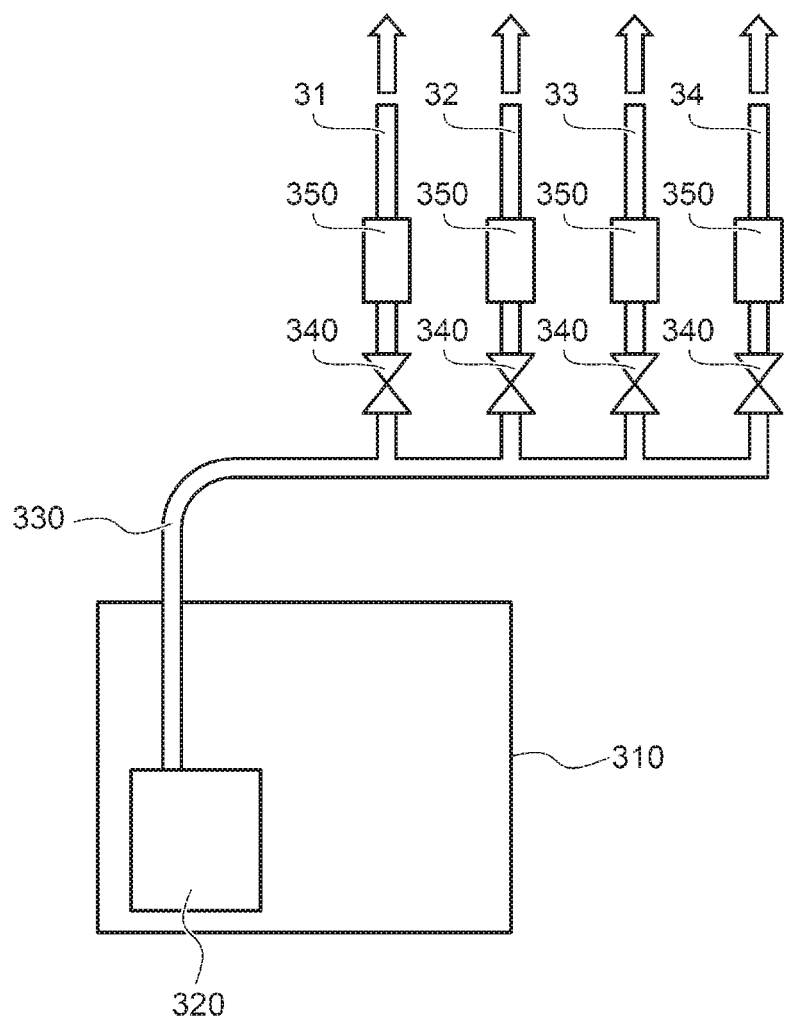
FIG. 5 is a system diagram of a water supply nozzle.

FIG. 5 is a system diagram of a water supply nozzle.

FIG. 5 illustrates a system diagram of the first water supply nozzle 31 to the fourth water supply nozzle 34. A pump 320 is contained in a water storage tank 310. The water fed from the water storage tank 310 to a pipe 330 by the pump 320 is fed to the first water supply nozzle 31, the second water supply nozzle 32, the third water supply nozzle 33, and the fourth water supply nozzle 34 via branches of the pipe 330.

A valve 340 and a water flow meter 350 are provided to each pipe 330 of the first water supply nozzle 31, the second water supply nozzle 32, the third water supply nozzle 33, and the fourth water supply nozzle 34. An opening degree of the valve 340 may be controlled by a controller (not shown) based on a measured value of the water flow meter 350.

An amount of water supplied from each of the first water supply nozzle 31, the second water supply nozzle 32, the third water supply nozzle 33, and the fourth water supply nozzle 34 may be controlled independently. This allows water supply at an optimal flow rate for rice-polishing and rice-rinsing, from the first water supply nozzle 31, the second water supply nozzle 32, the third water supply nozzle 33, and the fourth water supply nozzle 34. Further, by manually setting the opening degree of the valves connected to each of the first water supply nozzle 31, the second water supply nozzle 32, the third water supply nozzle 33, and the fourth water supply nozzle 34, flow rate information read by the water flow meter 350 may be transmitted to the controller, and an alarm may be issued when the flow rate deviates from the set flow rate.

The storage tank 310 may also serve as the placing part 50. Further, the water storage tank 310 may be housed inside the placing part 50. This can achieve space saving of the apparatus. In the example shown in FIG. 5, the water stored in the water storage tank 310 is fed to the pipe 330 by the pump 320, but the water may be fed directly from a water pipe to the pipe 330 without providing the water storage tank 310 and the pump 320. When a water pressure of the water pipe is insufficient, a pressure increasing pump to increase the water pressure may be provided between the water pipe and the pipe 330, to obtain a water pressure applicable for the water supply. Here, stabilizing a pressure of tap water is required to ensure the wash-rice performance quality of this apparatus. This is because, in this apparatus, the frictional separation effect by the pressurized-stirring described above requires a stable ratio in very small time unit, for a ratio between an amount of water to be added and an amount of rice grains to be segmented and fed. If water is used as water for different purpose in the same pipe, the water pressure decreases immediately, the sequential high pressure is applied to the rice grains to crush and squash the rice grains, and the pressurized-stirring screw 22 may be locked to break the main machine. Thus, ensuring stable water pressure is required.

Figure 6:
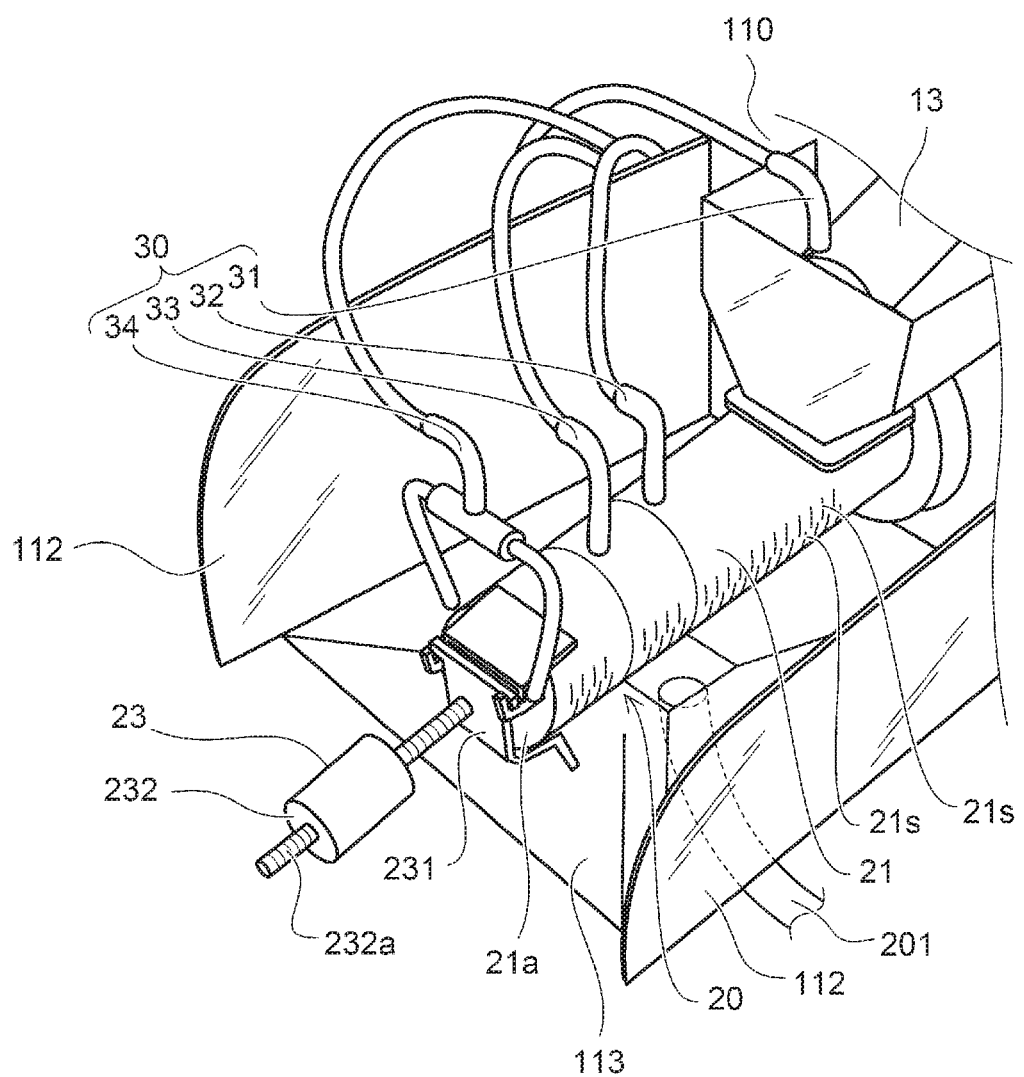
FIG. 6 is a perspective view illustrating the pressurized-stirring part.

FIG. 6 is a perspective view illustrating the pressurized-stirring part.

A side cover 112 is provided on a left and right sides of the pressurized-stirring part 20 protruding from the cover 110. In addition, a drain cover 113 extending from the side cover 112 is provided below the pressurized-stirring part 20. A hose 201 is connected to the drain cover 113, and water falling downward from the pressurized-stirring part 20 can be received by the drain cover 113, to be discharged from the hose 201 to outside.

On a lower side (bottom side) of the cylinder 21 of the pressurized-stirring part 20, a drain slit 21s is provided. The drain slit 21s is a hole provided in an elongated shape along a circumference of the cylinder 21. The drain slit 21s is provided in such a size through which the milled rice does not pass. The drain slit 21s discharges the water fed from the first water supply nozzle 31, the second water supply nozzle 32, and the third water supply nozzle 33 into the cylinder 21 to be used for rice-polishing. The water discharged from the drain slit 21s is received by the drain cover 113, to be discharged outside from the hose 201.

Figure 7:
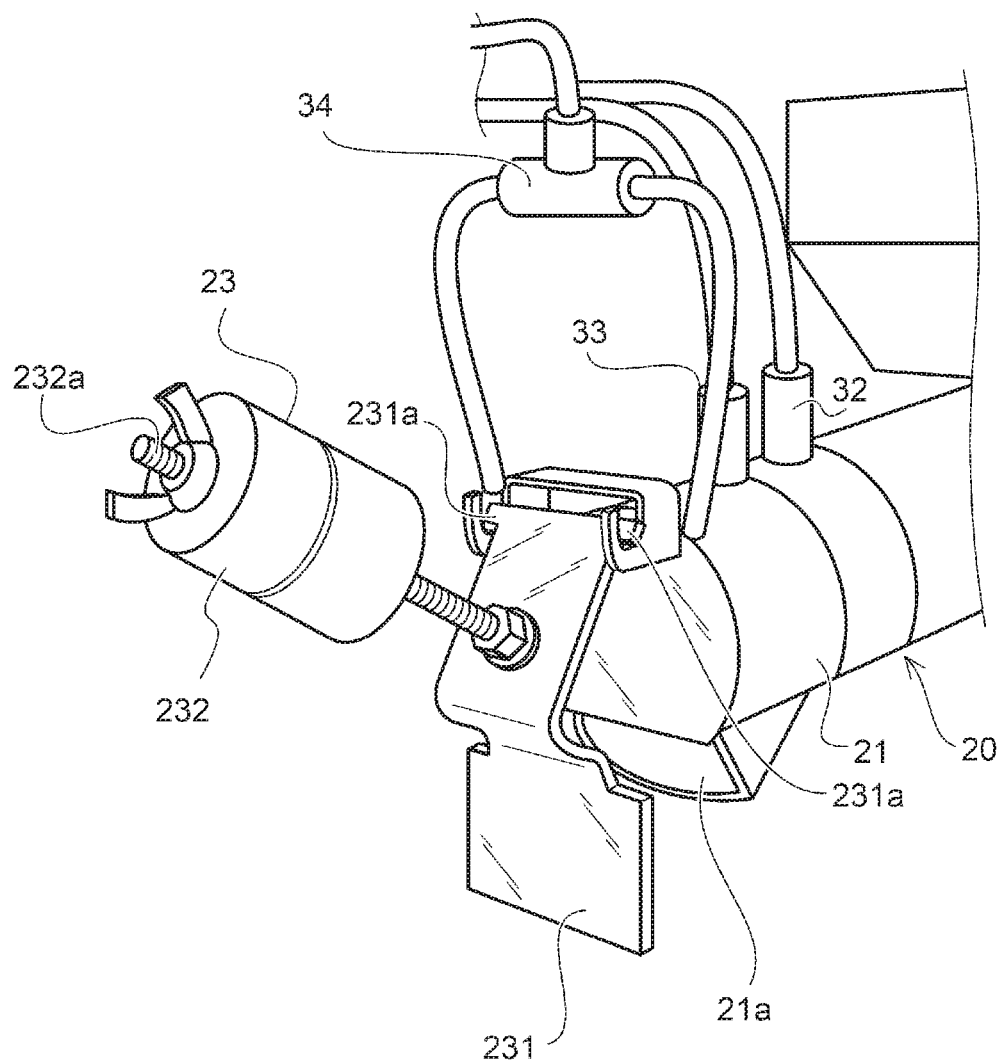
FIG. 7 is a perspective view illustrating a pressure adjusting part.

FIG. 7 is a perspective view illustrating the pressure adjusting part.

FIG. 7 shows a state where the lid 231 is opened. The lid 231 of the pressure adjusting part 23 is provided capable of being opened and closed about a supporting point 231a. A bolt 232a is provided to protrude on the lid 231, and the weight 232 is attached to the bolt 232a. A female screw is provided on the weight 232 and is screwed with the bolt 232a. Changing the position of the weight 232 with respect to the bolt 232a enables adjustment of the pressure applied to the lid 231. That is, as the weight 232 approaches the lid 231, a distance between the supporting point 231a and the weight 232 becomes closer, and the pressure for closing the lid 231 decreases. Conversely, as the weight 232 is separated from the lid 231, the distance between the supporting point 231a and the weight 232 increases, and the pressure for closing the lid 231 increases.

Pressure adjustment with the pressure adjusting part 23 enables adjustment of strength of the frictional separation effect between the rice grains in the cylinder 21. For example, the strength of the frictional separation effect can be adjusted by the pressure adjusting part 23 according to a type of rice (Japonica rice or Indica rice), variation in storage condition, and quality requirements of the rice to be used.

Figure 8A:
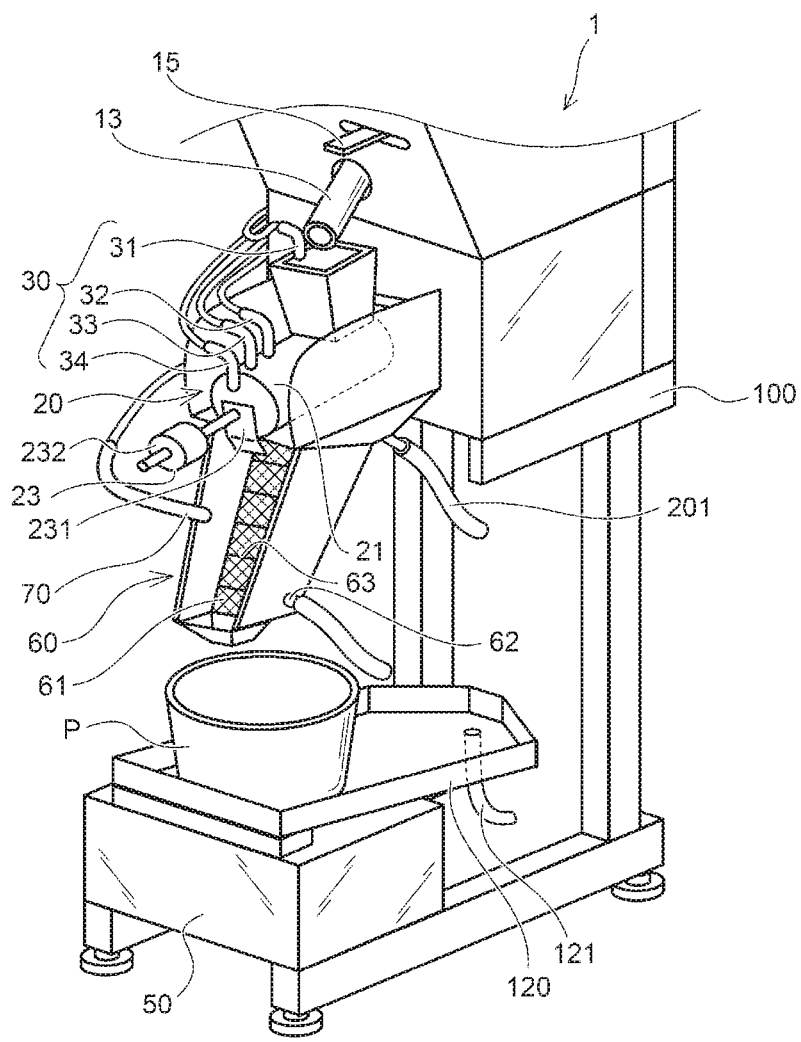
FIGS. 8A and 8B are perspective views illustrating a separation part.
Figure 8B:
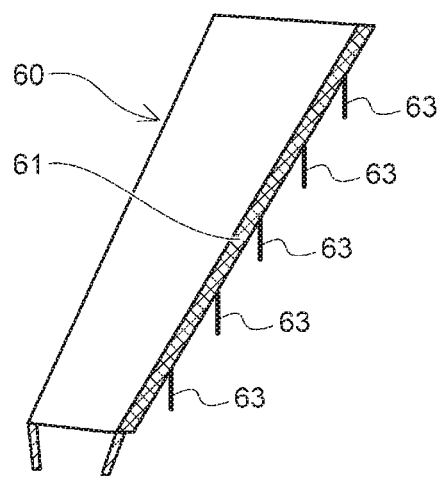

FIGS. 8A and 8B are schematic views illustrating a separation part.

FIG. 8A shows a perspective view, and FIG. 8B shows a cross-sectional view of the separation part.

The rice washer 1 may be provided with a separation part 60 as shown in FIGS. 8A and 8B. The separation part 60 is provided at a rear-stage of the pressurized-stirring part 20 and serves to separate the milled rice coming out from the pressurized-stirring part 20 and water. The separation part 60 has a mesh part 61 arranged to be inclined, and a drainage passage 62 arranged below the mesh part 61.

When the milled rice mixed in water comes out from the pressurized-stirring part 20, the water passes through the mesh part 61 to be discharged outside from the drainage passage 62 through the hose. Whereas, the milled rice falls along a surface of the mesh part 61 without passing through the mesh part 61, to be accommodated in the pot P.

As shown in FIG. 8B, a draining separation plate 63 may be provided on a back surface of the mesh part 61. A plurality of draining separation plates 63 are arranged at predetermined intervals on the back surface of the mesh part 61. Each draining separation plate 63 extends in a width direction of the mesh part 61 and is provided such that a surface of the plate is substantially vertical. As a result, the water having passed through the mesh part 61 flows along the back surface of the mesh part 61 and falls downward at the draining separation plate 63. That is, it is possible to suppress returning of the water having passed through the mesh part 61 to the front surface of the mesh part 61 again.

Further, there may be provided a second water supply part 70 configured to supply rinsing water toward the separation part 60. The second water supply part 70 supplies the rinsing water toward the mesh part 61. This enables additional rinsing of the milled rice falling along the surface of the mesh part 61. The rinsing water passes through the mesh part 61, to be discharged from the drainage passage 62.

(Rice-Washing Operation)

Next, a rice-washing operation with the rice washer 1 will be described.

First of all, milled rice to be washed is charged from the hopper 11 of the charging part 10. At this time, a required amount of milled rice can be stored in the hopper 11 by keeping the opening/closing lever 15 closed. Next, the operation display part 111 is operated to instruct a start of the rice-washing operation. Here, depending on a type and amount of rice, a condition of rice, and the like, a mode selection may be available for the rice-washing operation (a rotation speed of the feeding part 12, a rotation speed of the pressurized-stirring screw 22, a supply amount of water from the first water supply part 30, a control sequencer, and the like). Then, the opening/closing lever 15 is opened.

This causes the milled rice to be sequentially fed from the hopper 11 to the pressurized-stirring part 20. The milled rice fed to the pressurized-stirring part 20 is fed into the cylinder 21 with rotation of the pressurized-stirring screw 22. Into the cylinder 21, water is supplied from the first water supply part 30. Then, while moving in the cylinder 21, the milled rice is agitated by the projecting strip portion 222 of the pressurized-stirring screw 22 while being pressurized, and is polished with the frictional separation effect between rice grains.

Further, the milled rice moved by the pressurized-stirring screw 22 is agitated and rinsed by the rinsing blade 223. The lid 231 of the pressure adjusting part 23 is opened by pressure of feeding of the milled rice, to discharge the milled rice from the opening 21a of the cylinder 21. When the separation part 60 is provided, the milled rice and water are efficiently separated by the separation part 60, and the milled rice polished and rinsed is accommodated in the pot P.

Further, when the foreign matter removing part 40 is provided, a foreign matter (a large light foreign matter, such as a rice chaff piece or a feather piece, which floats in water and does not come out from the mesh of rice-washing cylinder) mixed in the washed milled rice accommodated in the pot P can be discharged out of the pot P. After the rice-washing process, the pot P is inclined on the placing part 50 to discharge the water in the pot P.

In the rice washer 1 of the present embodiment, it is possible to continuously wash milled rice charged into the hopper 11, with the rotation of the pressurized-stirring screw 22. This can eliminate a need for a large space to store the milled rice for the rice-washing process, and can reduce the size of the entire apparatus.

In addition, since the polishing and rinsing are performed while moving the milled rice in the cylinder 21 with the rotation of the pressurized-stirring screw 22, starch layer bran can be reliably removed from rice grains in a short time. Specifically, in the rice washer 1 of the present embodiment, in a state where the milled rice is charged into the hopper 11, a time from feeding the milled rice to the pressurized-stirring part 20 until discharging from the opening 21a is about 5 seconds to 10 seconds. This short time is most required. In the present embodiment, for any large amount of rice, polishing and rinsing are completed within over ten seconds from contact of the rice grains and water.

The rice washer 1 of the present embodiment can perform rice-washing at such a speed. Therefore, for milled rice of about 5 kg to 7 kg, for example, when unpacked rice is charged into the hopper 11, the pot P is placed on the placing part 50, and the rice-washing operation is started by operating the operation display part 111, washed milled rice will be accommodated in the pot P after several tens of seconds (about 30 seconds). By providing a sensor (not shown) in the hopper 11, the rice washer 1 may be automatically stopped in response to detection of running out of the milled rice in the hopper 11. As described above, it is also favorable for washing rice in one pot units.

Second Embodiment

Figure 9:
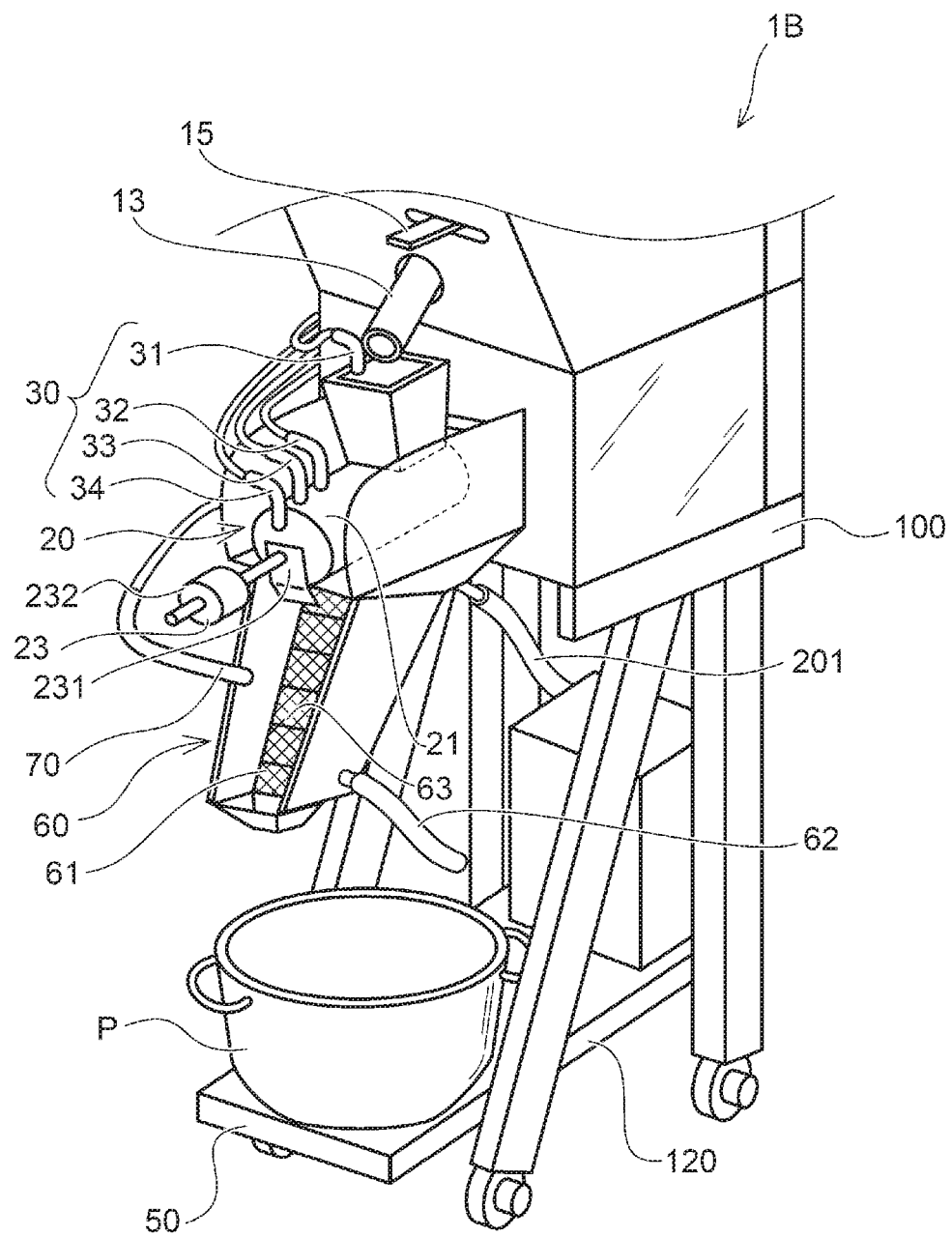
FIG. 9 is a perspective view illustrating a rice washer according to a second embodiment.

FIG. 9 is a perspective view illustrating a rice washer according to a second embodiment.

Figure 10:
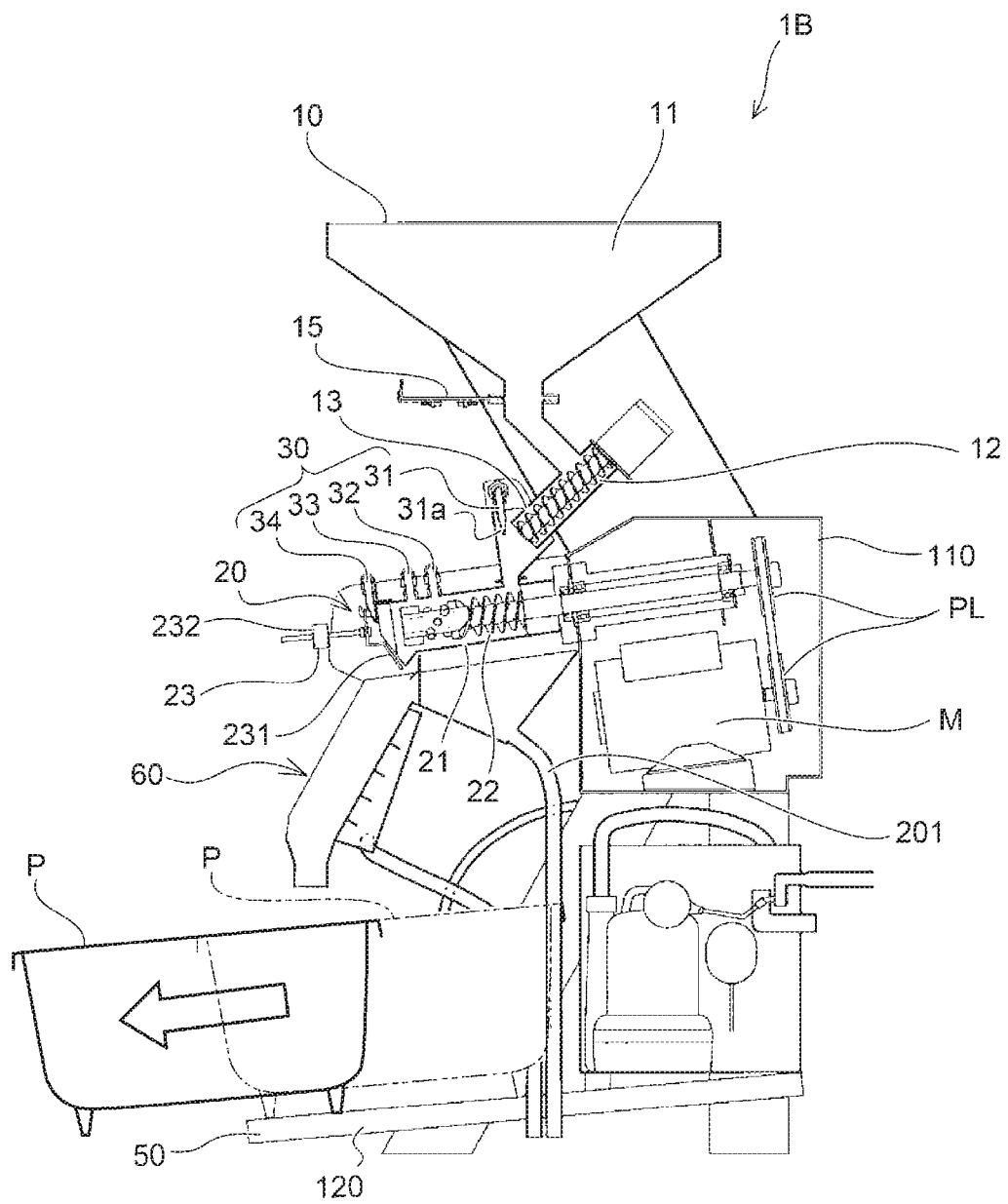
FIG. 10 is an internal configuration view illustrating the rice washer according to the second embodiment.

FIG. 10 is an internal configuration view illustrating the rice washer according to the second embodiment.

A rice washer 1B according to the present embodiment has a configuration applicable for a relatively large pot P. That is, in the rice washer 1B, a placing part 50 to be placed with the pot P is different from the rice washer 1 according to the first embodiment.

In the placing part 50 of the rice washer 1B, a tray 120 to be placed with the pot P is provided to be downwardly inclined to the front. Other configurations are similar to those of the rice washer 1 according to the first embodiment. Since the tray 120 is inclined to be lowered to the front, it is possible to provide a wider interval from the tray 120 to a pressurized-stirring part 20 and the separation part 60. Therefore, it is easy for the pot P to be taken in and out.

In addition, since the tray 120 is inclined to be lowered to the front, the heavy pot P accommodating the washed milled rice can be easily withdrawn by utilizing the inclination of the tray 120, when being withdrawn from the tray 120. From these facts, the rice washer 1B of the present embodiment is effective when it is desired to accommodate the washed milled rice in a relatively large pot P.

In any of the above embodiments, there may be used a wash-rice sieve instead of the pot P that receives the milled rice after the rice-washing process. When the wash-rice sieve is used, a draining operation can be omitted because the water from the rice-washing process does not accumulate in the wash-rice sieve.

(Foreign Matter Removal)

Next, details of foreign matter removal with the foreign matter removing part 40 will be described.

Figure 11A:
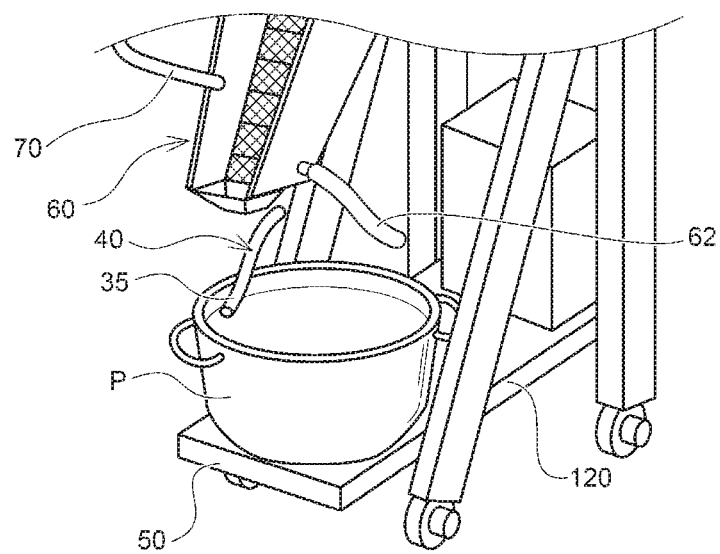
FIGS. 11A and 11B are schematic views showing an example of foreign matter removal.
Figure 11B:
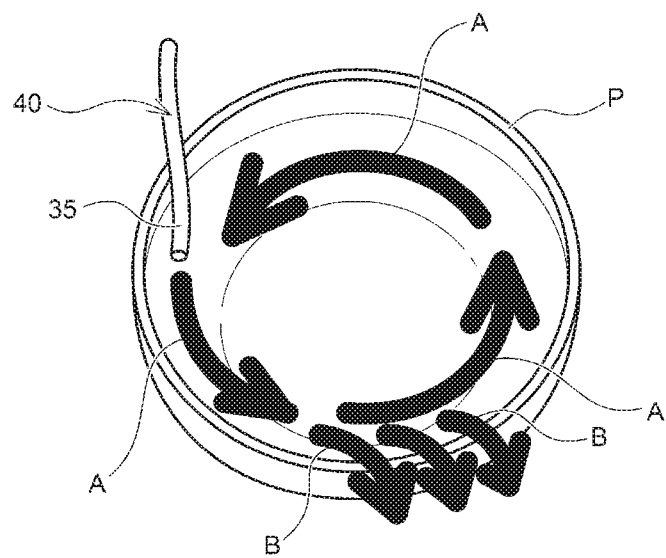

FIGS. 11A and 11B are schematic views showing an example of foreign matter removal.

Figure 12:
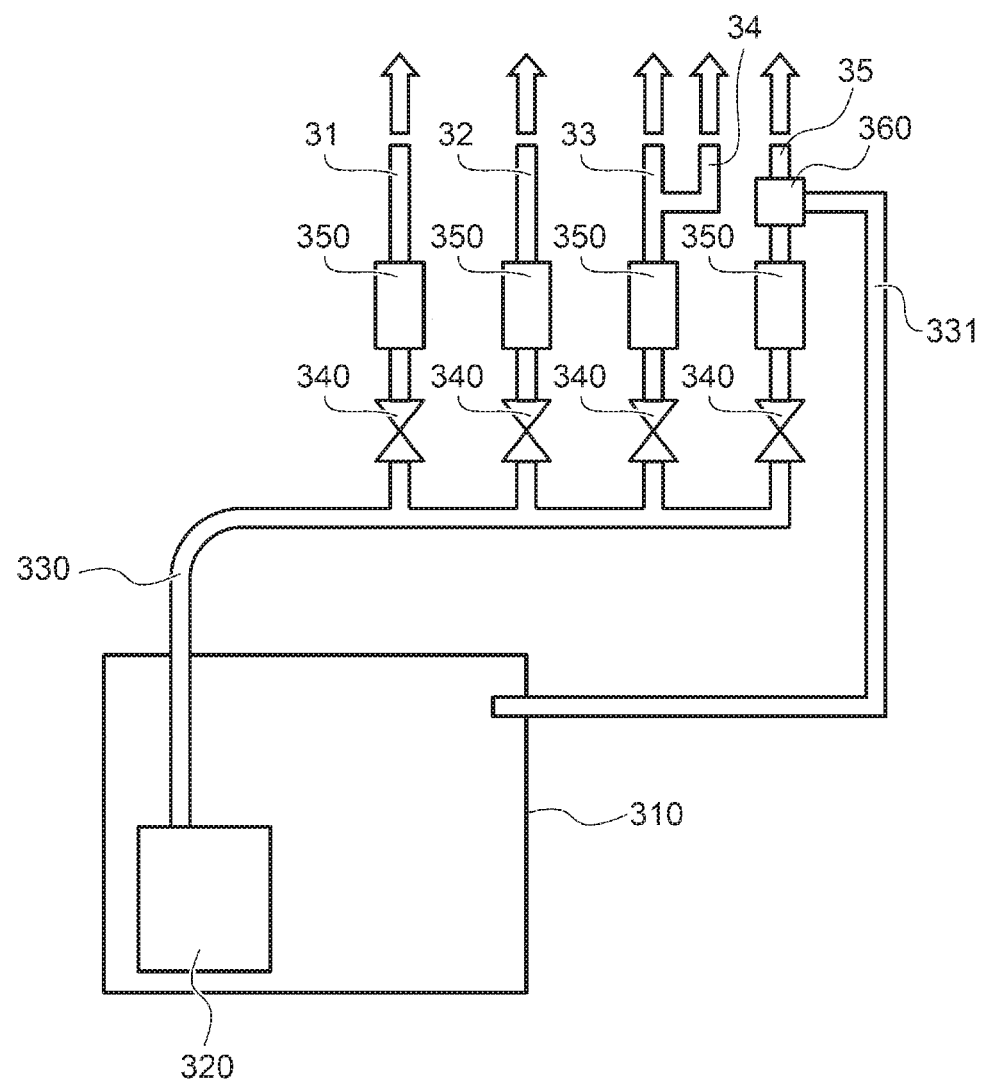
FIG. 12 is a system diagram of the water supply nozzle including a water supply nozzle for foreign matter removal.

FIG. 12 is a system diagram of the water supply nozzle including a water supply nozzle for foreign matter removal.

As shown in FIGS. 11A and 11B, the foreign matter removing part 40 includes a water supply nozzle 35 for foreign matter removal. The water supply nozzle 35 for foreign matter removal is arranged so as to supply water along a tangent line of an inner peripheral surface of the pot P. The water supply nozzle 35 for foreign matter removal may be arranged so as to hang down from above the pot P into the pot P.

When water is supplied from the water supply nozzle 35 for foreign matter removal, the water flows along the inner peripheral surface of the pot P and creates a whirling water flow (see arrows A in FIG. 11B). When a foreign matter has been mixed into the pot P together with the washed milled rice, the foreign matter rises up with the water filled in the pot P and the water flow, and rotates with the water flow. Then, the foreign matter is discharged outside of the pot P together with the water overflowing from the pot P (see arrows B in FIG. 11B).

In the system of the water supply nozzle shown in FIG. 12, the water supply nozzle 35 for foreign matter removal is provided via a branched pipe 330, a valve 340, a water flow meter 350, and a three-way switching valve 360. For foreign matter removal, water is fed toward the water supply nozzle 35 for foreign matter removal by switching the three-way switching valve 360. This causes discharging of the water from the water supply nozzle 35 for foreign matter removal. On the other hand, when foreign matter removal is not performed, the water is fed in a direction of the pipe 331 by switching the three-way switching valve 360. This causes the water to be fed back to the water storage tank 310 via the pipe 331, rather than being fed to the water supply nozzle 35 for foreign matter removal.

In the system of the water supply nozzle, a fourth water supply nozzle 34 may be provided independently as shown in FIG. 5, or may be provided to be branched from the third water supply nozzle 33, as shown in FIG. 12. Providing the fourth water supply nozzle 34 to be branched from the third water supply nozzle 33 allows the valve 340 and the water flow meter 350 to be shared.

Foreign matter removal with such the foreign matter removing part 40 allows a foreign matter to float with the water flow and to be discharged outside of the pot P, even when the foreign matter is mixed in the milled rice accommodated in the pot P.

Third Embodiment

Figure 13:
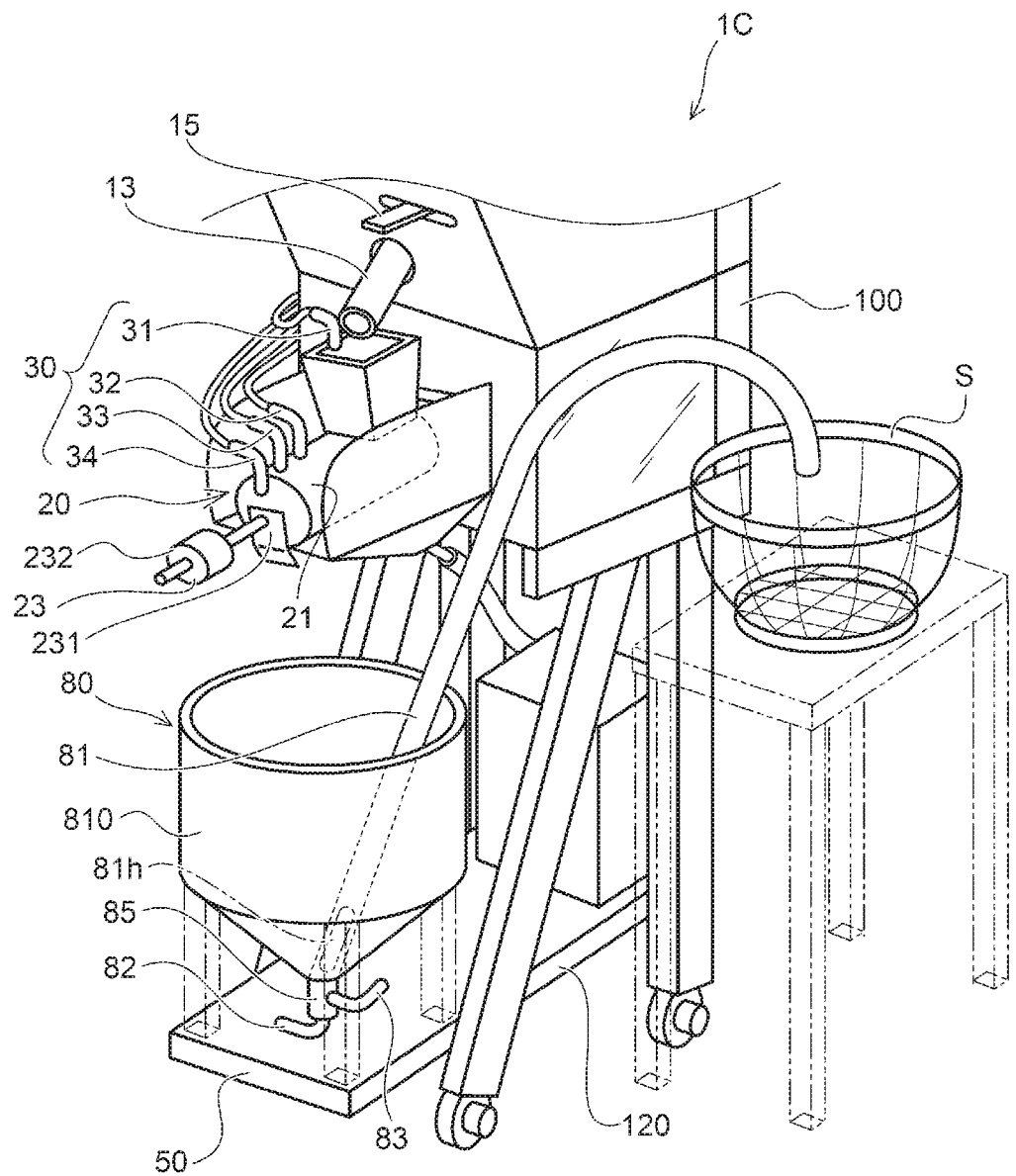
FIG. 13 is a perspective view illustrating a rice washer according to a third embodiment.

FIG. 13 is a perspective view illustrating a rice washer according to a third embodiment.

Figure 14:
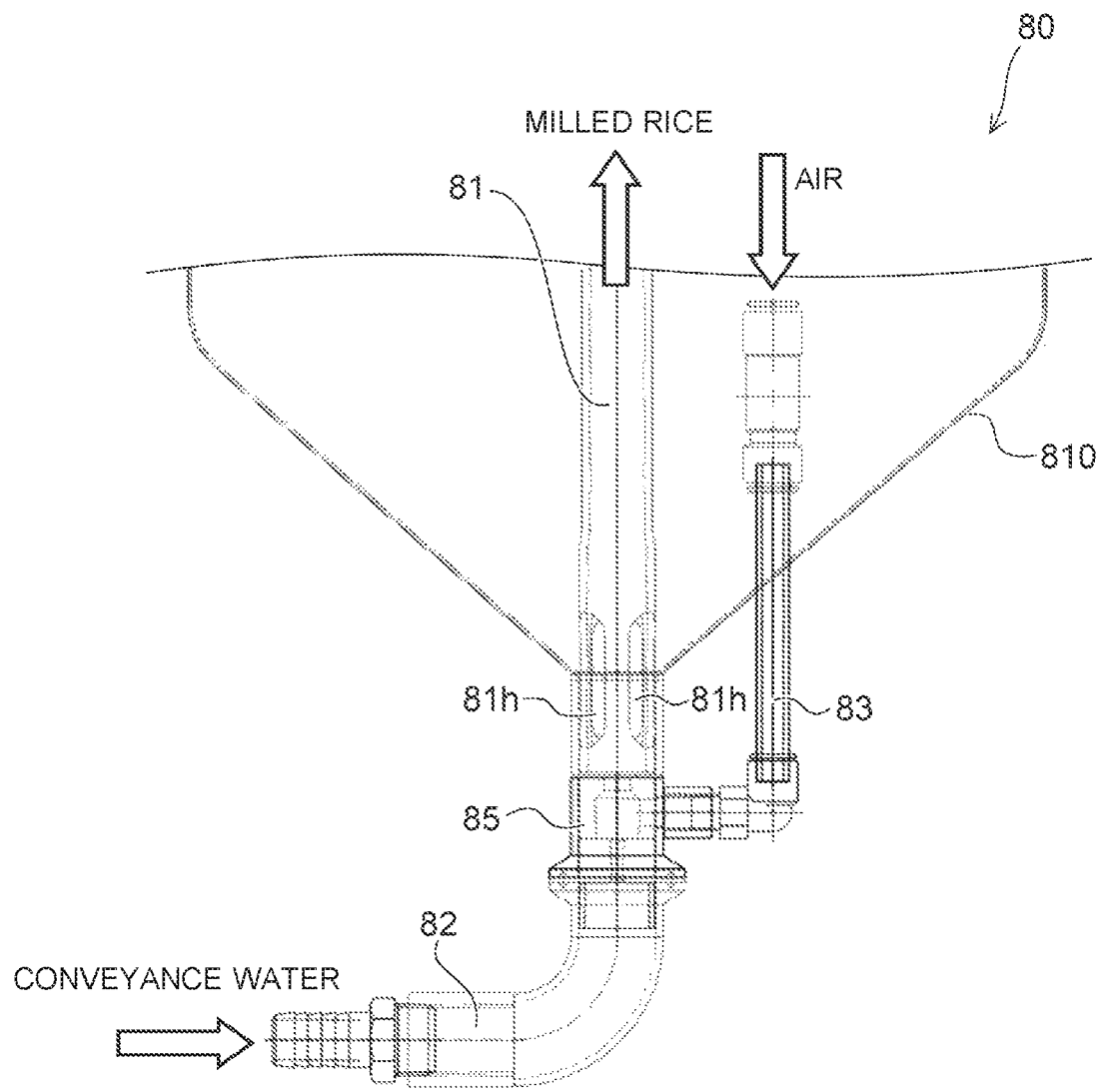
FIG. 14 is a cross-sectional view illustrating a configuration of a water flow conveying part.

FIG. 14 is a cross-sectional view illustrating a configuration of a water flow conveying part.

A rice washer 1C according to the present embodiment is provided with a water flow conveying part 80 at a rear-stage of a pressurized-stirring part 20. The rice washer 1C has a configuration in which milled rice completed of rice-polishing and rice-rinsing with the pressurized-stirring part 20 is fed to the water flow conveying part 80.

The water flow conveying part 80 has a function of conveying the milled rice to a sieve S with a water flow. A position of the sieve S to receive the milled rice is arranged at a height easy for an operator to handle, and the milled rice can be conveyed to this position with a water flow.

The water flow conveying part 80 has: a receiving part 810 configured to receive the milled rice below the pressurized-stirring part 20; a conveying pipe 81 configured to feed the milled rice to the sieve S; and a conveyance water feeding part 82 configured to supply conveyance water to the conveying pipe 81. As shown in FIG. 14, the receiving part 810 has a shape in which a bottom part of a cylindrical container is narrowed toward a center (inverted cone shape), and the conveying pipe 81 is provided to extend upward from the center of this bottom part.

In the conveying pipe 81, a suction port 81h is provided. This causes the milled rice fed to the receiving part 810 to be collected at the bottom part, and sucked into the conveying pipe 81 from the suction port 81h. At a lower end of the conveying pipe 81, a conveyance water feeding part 82 is provided to feed the conveyance water into the conveying pipe 81. Between the conveyance water feeding part 82 and the suction port 81h, a mixing part 85 is provided. An air feeding part 83 is provided in the mixing part 85, in which the conveyance water and air are mixed.

In the mixing part 85, a flow path diameter of the conveyance water is once narrowed from the conveyance water feeding part 82 side toward the downstream side, and then thickened again. A flow speed of the conveyance water increases at a portion where the flow path diameter is narrowed, and air is taken into the conveyance water from the air feeding part 83 with negative pressure generated at the thickened portion. Power of the conveyance water is strengthened by taking of the air, and the conveyance water is fed into the conveying pipe 81. The milled rice having been sucked in from the suction port 81h is to be conveyed to the position of the sieve S, with the power of the conveyance water.

In addition, while being conveyed by the conveyance water in the conveying pipe 81, the milled rice is rinsed by the power of the conveyance water. Therefore, in addition to the rinsing by the pressurized-stirring part 20, the milled rice is also rinsed when being conveyed in the conveying pipe 81. The milled rice fed to the sieve S will be drained and separated from the conveyance water.

With such the rice washer 1C, it is possible to perform rice-polishing and rice-rinsing with the pressurized-stirring part 20, perform conveying and additional rice-rinsing with the water flow conveying part 80, and convey the milled rice to a position easy for an operator to handle.

An example of the rice-washing operation with the rice washer 1C will now be described.

The rice-washing operation is performed in the following order of (1) to (9).

(1) The main switch is turned ON.

(2) Milled rice is charged into the hopper 11.

(3) A milled rice amount selection button is pressed. This causes rotation of the pressurized-stirring screw 22, opens a water supply solenoid valve for rice-washing, and starts water supply from the first water supply nozzle 31, the second water supply nozzle 32, and the third water supply nozzle 33.

(4) When an operator opens the opening/closing lever 15, milled rice is supplied into the cylinder 21, and rice-washing is performed. The washed milled rice is discharged from the cylinder 21, and falls into the receiving part 810 below the cylinder 21, to be stored.

(5) The sensor of the hopper 11 recognizes that there is no milled rice in the hopper 11.

(6) After several seconds, a water supply solenoid valve for rice-washing is closed, and at the same time, a solenoid valve for residual-rice discharge is opened. At this time, high pressure water is injected from the first water supply nozzle 31 and the third water supply nozzle 33 (e.g., for over ten seconds), to discharge residual rice in the cylinder 21.

(7) After a set injection time has elapsed, the solenoid valve for residual-rice discharge is closed, and at the same time, a solenoid valve for water flow conveyance is opened. Consequently, the conveyance water is fed to the conveying pipe 81 of the water flow conveying part 80, and air is taken into the conveyance water from the air feeding part 83. The milled rice stored in the receiving part 810 is sucked in from the suction port 81h of the conveying pipe 81, and is conveyed to the sieve S by the water flow of the conveyance water mixed with air.

(8) After the conveyance time, which has been set in (3) for the charged amount, has elapsed, the solenoid valve for water flow conveyance is closed, to complete the conveyance.

(9) An end buzzer beeps to inform the end of the rice-washing work.

OTHER CONFIGURATION EXAMPLES

In addition to the configuration described above, the rice washer may further have the following functions and configurations.

Figure 15:
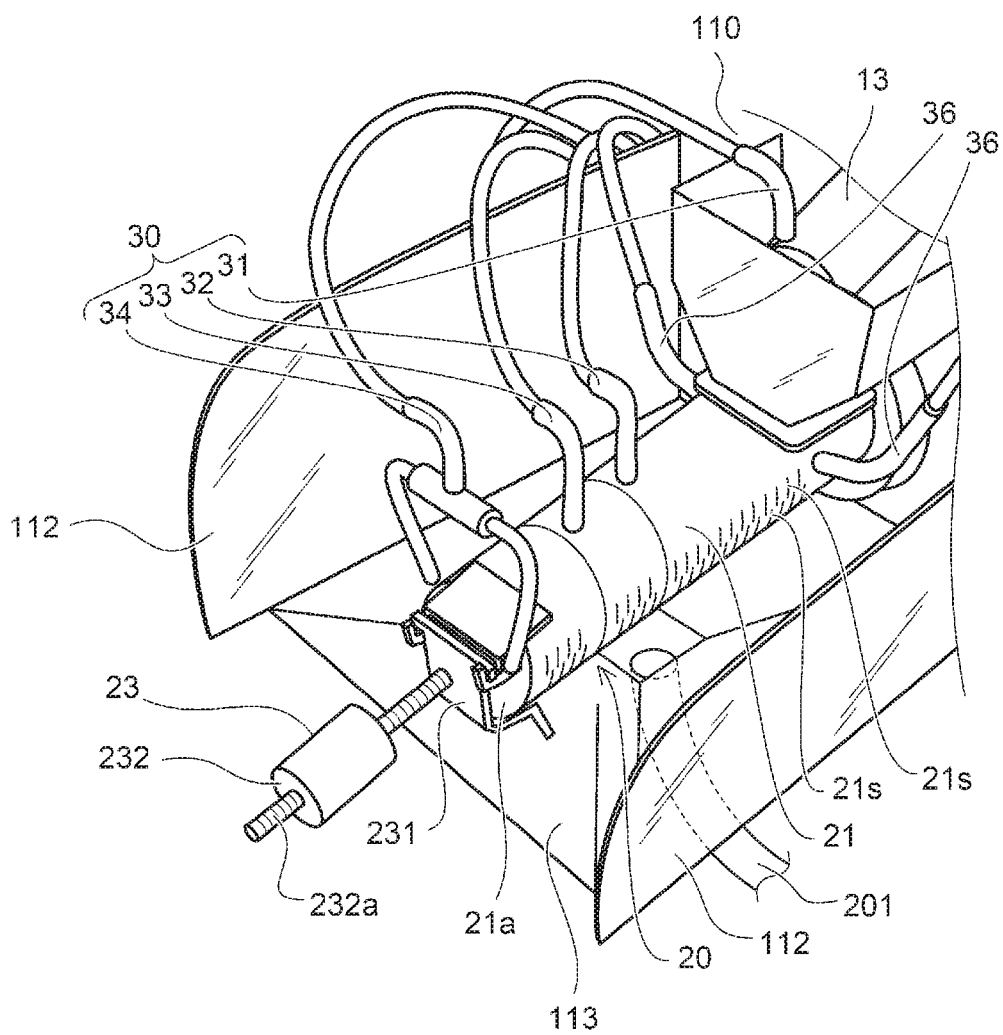
FIG. 15 is a perspective view illustrating a residual-rice discharging function.

(Residual-Rice Discharging Function) FIG. 15 is a perspective view illustrating a residual-rice discharging function.

The residual-rice discharging function is a function of discharging the milled rice remaining in the cylinder 21 of the pressurized-stirring part 20, to outside the cylinder 21. That is, milled rice may remain in the cylinder 21 after completion of pressurized-stirring, when the milled rice is fed into the cylinder 21 of the pressurized-stirring part 20 and subjected to pressurized-stirring with the pressurized-stirring screw 22. The pressurized-stirring part 20 may be added with a function of discharging this residual rice to outside the cylinder 21 (residual-rice discharging function).

As the residual-rice discharging function, there is applied a water supply nozzle 36 for discharge provided in the cylinder 21. The water supply nozzle 36 for discharge is provided, for example, at two positions of right and left on a base side of the cylinder 21, for example. In adopting a configuration in which the first water supply nozzle 31 supplies water to near the base of the cylinder 21, this first water supply nozzle 31 may be used as the water supply nozzle 36 for discharge. From the water supply nozzle 36 for discharge, high-pressure water is injected into the cylinder 21. This allows the high-pressure water to discharge the milled rice remaining in the cylinder 21, from the opening 21a to outside the cylinder 21.

(Another Pressure Adjusting Part)

Figure 16:
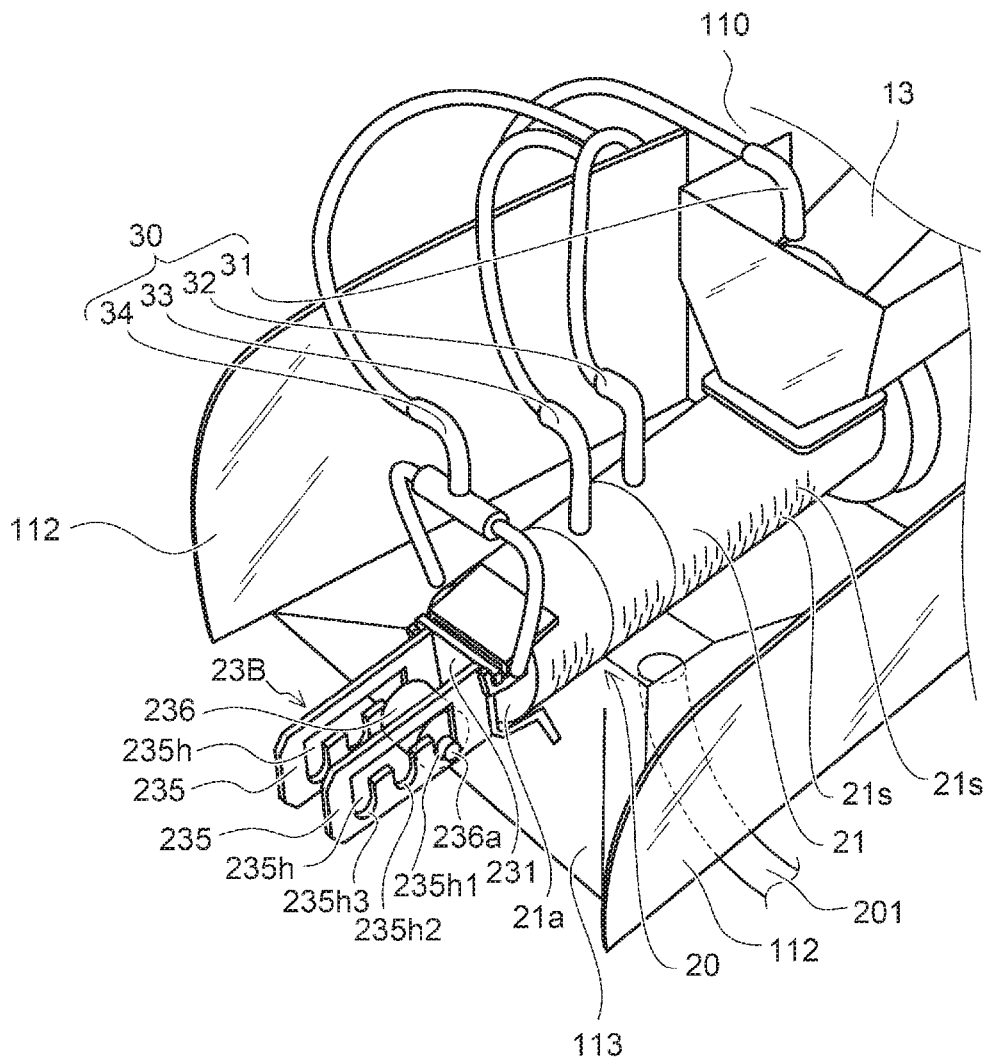
FIG. 16 is a perspective view illustrating another pressure adjusting part.

FIG. 16 is a perspective view illustrating another pressure adjusting part.

As shown in FIG. 16, another pressure adjusting part 23B includes a pair of support plates 235 extending from a lid 231, and a movable weight 236 disposed between the pair of support plates 235. Each of the pair of support plates 235 is provided with a guide hole 235h. The guide hole 235h is provided with a plurality of positioning holes 235h1 to 235h3 that are cut downward. In the illustrated example, three positioning holes 235h1 to 235h3 are provided to each guide hole 235h.

Projections 236a are provided at both ends of the movable weight 236, and each of the projections 236a at the both ends is fitted into the guide hole 235h. This causes the movable weight 236 to be movably supported along the guide hole 235h. Then, fitting the projection 236a into any one of the positioning holes 235h1 to 235h3 can change a support position of the movable weight 236.

With such a structure, a distance of the movable weight 236 from the lid 231 can be adjusted stepwise in accordance with the position of the positioning holes 235h1 to 235h3. For example, when the projection 236a is fitted into the positioning hole 235h1 closest to the lid 231, the pressure for closing the lid 231 is the smallest. When the projection 236a is fitted into the positioning hole 235h3 farthest from the lid 231, the pressure for closing the lid 231 is the largest. Further, when the projection 236a is fitted into the positioning hole 235h2 in a middle, the pressure for closing the lid 231 is moderate.

In the pressure adjusting part 23B, pressure of the lid 231 can be easily adjusted in a short time by simply sliding the movable weight 236 along the guide hole 235h. In the present embodiment, three positioning holes 235h1 to 235h3 are provided, but the positioning holes may be provided more finely.

(About Infiltration of Water in Rice-Washing)

When milled rice comes into contact with water, water begins to infiltrate into a starch layer of endosperm from the moment of the contact. A rate of this infiltration is about 1 to 2 μm per second. As water infiltration begins, swelling starts between starch particles, and this strain causes a phenomenon in which an aggregate of starch granules (aggregate of several units of starch particles in block units) is peeled off from the rice grain body in aggregate units. For example, for an aggregate having a size of 2 μm×15 μm, a starch aggregate (a small block of rice starch) will be peeled off from rice grains after about 30 seconds from touching water. In other words, until a time at which such peeling of the starch aggregate occurs, a strong frictional separation effect may be applied between rice grains.

On the other hand, when milled rice comes into contact with water, wet softening of rice grain surface starts from the moment of the contact. Pressurizing and rubbing rice grains that have been wet-softened for a long time are not desirable for rice-polishing. Therefore, even for a large amount of rice, after performing rice-polishing within several seconds, and rice-rinsing is performed within several tens of seconds, applying a force to the rice grains is desirably avoided as much as possible.

Based on such findings, the present inventors have found the configurations of the rice washers 1, 1B, and 1C that can reliably remove starch layer bran from rice grains without peeling of a starch aggregate, by generating a frictional separation effect between rice grains to perform rice-polishing within a time from contact of milled rice with water until the peeling of the starch aggregate occurs, and then promptly performing from rice-rinsing to separating dilution.

According to the configurations of the rice washers 1, 1B, and 1C of the present embodiment, it is possible to realize 5 seconds or less per grain (at most 10 seconds or less) as a time for washing rice in the pressurized-stirring part 20, and it is possible to complete the rice-washing work by simply passing through the pressurized-stirring part 20 one time so as not to basically move rice grains subjected to water infiltration for more than 30 seconds. In other words, the milled rice having been washed once is not to be washed again by circulating the rice washers 1 and 1B. In the rice washer 1C, although the rice having passed through the pressurized-stirring part 20 comes into contact with the conveyance water at the conveyance water feeding part 82, the time during which the rice is in contact with the conveyance water as a jet stream is very short, and the wet softening of the rice grain surface is minor.

For this reason, it is possible to obtain a very high rice-washing yield rate (about 99% to 99.3%) in the rice washers 1 and 1B. Here, rice-washing yield rate (%)=(mass of washed rice/mass of original milled rice)×100. However, since it is difficult to actually measure the mass of washed rice, the mass of the washed rice is determined using biochemical oxygen demand (BOD) value.

A calculation formula for determining the mass of washed rice from the BOD value is as follows. In the following formula, a unit is kg for the mass of washed rice, the mass of original milled rice, and a total amount of rice-washing water.

Mass of washed rice=Mass of original milled rice−(Total amount of rice-washing water×BOD value of rice-washing wastewater÷0.85)

In the above formula, the reason for dividing the BOD value by 0.85 is as follows. That is, a component mass calculated from the BOD value is an absolute mass, which is a mass not including 15% of moisture that is originally contained in milled rice. Therefore, for correcting the amount of 15%, the BOD value is divided by 0.85.

Therefore, the calculation formula for determining the rice-washing yield rate from the BOD value is as follows.

Rice-washing yield rate (%)=((Mass of original milled rice−(Total amount of rice-washing water×BOD value of rice-washing wastewater÷0.85)/Mass of original milled rice))×100

A specific example of the calculation of the rice-washing yield rate in the rice washers 1 and 1B is as follows.

Conditions for washing rice are 100 kg of the mass of milled rice, 150 kg of the total amount of rice-washing water, and the BOD value of the rice-washing wastewater of 3500 ppm. The BOD value of 10000 ppm is 1%.

Calculation of the rice-washing yield rate based on this rice-washing conditions results in ((100 kg−(150 kg×0.0035÷0.85)/100 kg))×100=99.38%.

Since the rice washers 1 and 1B can efficiently and continuously process in a short time as described above, processing capability of performing rice-washing is about 600 kg per hour.

Moreover, an installation area of the rice washers 1, 1B, and 1C can be reduced to about 1 m². Since the installation area can be small like this, installation in a small space such as a kitchen at a shop or hotel does not cause obstruction. Further, by once charging milled rice to be washed into the charging part 10, and starting a rice-washing operation, washing rice to stopping the washing can be automatically performed, and a desired amount of rice can be washed without requiring complicated operations.

In particular, Japanese rice varieties available outside Japan are mainly distributed as milled rice in a single bag (5 kg or 10 kg), which is different from that in Japan, and are milled rice stored for nearly 200 days at normal temperature after milling. For washing such rice, the rice washers 1, 1B, and 1C of the present embodiment are very suitable, in which the time characteristic of rice-polishing and rice-rinsing is considered as described above.

According to the rice washers 1, 1B, and 1C of the present embodiment, it is possible to cook delicious rice without requiring any of an operator's rule of thumb or rice-washing techniques, and to perform rice-washing that can provide so-called long life rice (with less bacteria and with longer time to deteriorate).

As described above, according to the rice washer 1, 1B, and 1C of the embodiment, anyone can easily perform the rice-washing work, various kinds of rice can be properly washed irrespective of an amount of the rice, and it is possible to install in a saved space not to cause obstruction even when installed in a kitchen.

Although the present embodiment and specific examples thereof have been described above, the present invention is not limited to these examples. For example, the example has been described in which the washed milled rice is accommodated in the pot P in the above description, but it is also possible to apply the rice washer 1 and 1B to a rice cooking line. In this case, the rice washer 1 and 1B may be arranged such that the pressurized-stirring part 20 and the separation part 60 are arranged on a conveying part (conveying line) before rice cooking on the rice cooking line. Further, the example has been described in which rice is washed as grain in the above embodiment, but the present invention can be applied as a grain washer for washing other grains such as sesame, wheat (raw material for barley tea), coffee beans, by changing the screw or slit width of the cylinder. Further, the scope of the present invention includes those in which a component is appropriately added, deleted, or changed in design in each embodiment by one skilled in the art, and those in which each feature of the embodiment is appropriately combined, as long as including the gist of the present invention.

What is claimed is:

1. A rice washer comprising:
    a charging part into which milled rice is charged;
    a pressurized-stirring part provided at a rear-stage of the charging part and configured to, while pressurizing, stir and sequentially feed the milled rice charged from the charging part; and
    a first water supply part configured to supply water to the pressurized-stirring part, wherein the pressurized-stirring part comprises:
    a cylinder;
    a shaft part configured to rotate in the cylinder;
    a spiral blade configured to rotate together with the shaft part in the cylinder and sequentially feed the milled rice charged from the charging part;
    a projecting strip portion provided at a rear-stage of the spiral blade and configured to rotate together with the shaft part in the cylinder;
    a rinsing blade provided at a rear-stage of the projecting strip portion and configured to rotate together with the shaft part in the cylinder; and
    a pressure adjusting part configured to adjust pressure applied to the milled rice in the cylinder.

2. The rice washer according to claim 1, wherein the first water supply part comprises:
    a first water supply nozzle configured to supply the water toward the spiral blade in the cylinder;
    a second water supply nozzle configured to supply the water toward the projecting strip portion in the cylinder; and
    a third water supply nozzle configured to supply the water toward the rinsing blade in the cylinder.

3. The rice washer according to claim 1, further comprising a separation part provided at a rear-stage of the pressurized-stirring part and configured to separate the milled rice and the water.

4. The rice washer according to claim 3, wherein the separation part comprises:
    a mesh part arranged inclined; and
    a drainage passage disposed below the mesh part,
    wherein
        the water passes through the mesh part and is discharged from the drainage passage, and the milled rice falls along inclination of the mesh part without passing through the mesh part.

5. The rice washer according to claim 4, wherein a draining separation plate is provided on a back side of the mesh part.

6. The rice washer according to claim 3, further comprising a second water supply part configured to supply rinsing water to the separation part.

7. The rice washer according to claim 1, further comprising a foreign matter removing part configured to remove a foreign matter mixed in the milled rice discharged from the pressurized-stirring part.

8. The rice washer according to claim 1, further comprising a water flow conveying part provided at a rear-stage of the pressurized-stirring part and configured to convey the milled rice with a water flow.

9. The rice washer according to claim 8, wherein the water flow conveying part comprises:
    a conveying pipe provided with a suction port to suck the milled rice;
    a conveyance water feeding part configured to supply conveyance water to the conveying pipe; and
    an air mixing part configured to mix air into the conveyance water between the conveyance water feeding part and the suction port.

10. The rice washer according to claim 1, wherein the projecting strip portion includes a plurality of protruding portions which are arranged so as to draw a spiral around the shaft part at predetermined intervals.

11. The rice washer according to claim 1, wherein the rinsing blade includes a plurality of plate blades protruding from the shaft part.

* * * * *